United States Patent [19]

Bussard et al.

[11] Patent Number: 5,202,689

[45] Date of Patent: Apr. 13, 1993

[54] LIGHTWEIGHT FOCUSING REFLECTOR FOR SPACE

[75] Inventors: Robert W. Bussard, Manassas, Va.; Thomas H. Wallace, Gainesville, Fla.

[73] Assignee: APTI, Inc., Washington, D.C.

[21] Appl. No.: 748,877

[22] Filed: Aug. 23, 1991

[51] Int. Cl.⁵ .......................................... H01Q 15/20
[52] U.S. Cl. .................................... 342/10; 342/6; 343/915
[58] Field of Search .................. 342/5, 6, 10; 343/915

[56] References Cited

U.S. PATENT DOCUMENTS

| | | | |
|---|---|---|---|
| 2,798,478 | 7/1957 | Tarcici | 126/270 |
| 3,031,928 | 5/1962 | Kopito | 88/74 |
| 3,054,328 | 9/1962 | Rodgers | 88/73 |
| 3,165,751 | 1/1965 | Clark | 343/915 |
| 3,220,004 | 11/1965 | Gillespie, Jr. | 343/18 |
| 3,289,205 | 11/1966 | Kampinsky | 343/18 |
| 3,326,624 | 6/1967 | Von Maydel et al. | 350/293 |
| 3,354,458 | 11/1967 | Rottmayer | 343/18 |
| 3,471,860 | 10/1969 | Amburgey | 343/915 |
| 3,530,469 | 9/1970 | Dailey et al. | 343/18 |
| 3,546,706 | 12/1970 | Cover, Jr. et al. | 343/915 X |
| 3,694,059 | 9/1972 | Shakespeare | 350/310 |
| 3,936,159 | 2/1976 | Pavenick | 350/310 |
| 4,162,825 | 7/1979 | Dowty | 350/295 |
| 4,288,146 | 9/1981 | Johnson, Jr. et al. | 350/295 |
| 4,382,657 | 5/1983 | Lemaitre | 350/295 |
| 4,487,196 | 12/1984 | Murphy | 126/438 |
| 4,672,398 | 6/1987 | Ulry | 343/915 |
| 4,741,609 | 5/1988 | Sallis | 350/608 |

OTHER PUBLICATIONS

"Physics of Electric Propulsion"—Robert G. Jahn, McGraw-Hill Book Company, 1968.

Journal of the Astronautical Sciences, vol. 35, No. 1, pp. 75-96 (1987) Martinez-Sanchez "A Systems Study etc.".

Primary Examiner—T. H. Tubbesing
Attorney, Agent, or Firm—Foley & Lardner

[57] ABSTRACT

An adjustable focal length reflector for operation in space includes a membrane having a reflective surface. The membrane is subjected to incident radiation pressure. An assembly is located at the perimeter of the membrane to exert force on the membrane to counteract the incident radiation pressure in order to vary the focal length of the reflective surface. In a preferred embodiment the assembly includes an inflatable torus whose internal pressure is varied to vary the amount of force exerted on the membrane.

24 Claims, 8 Drawing Sheets

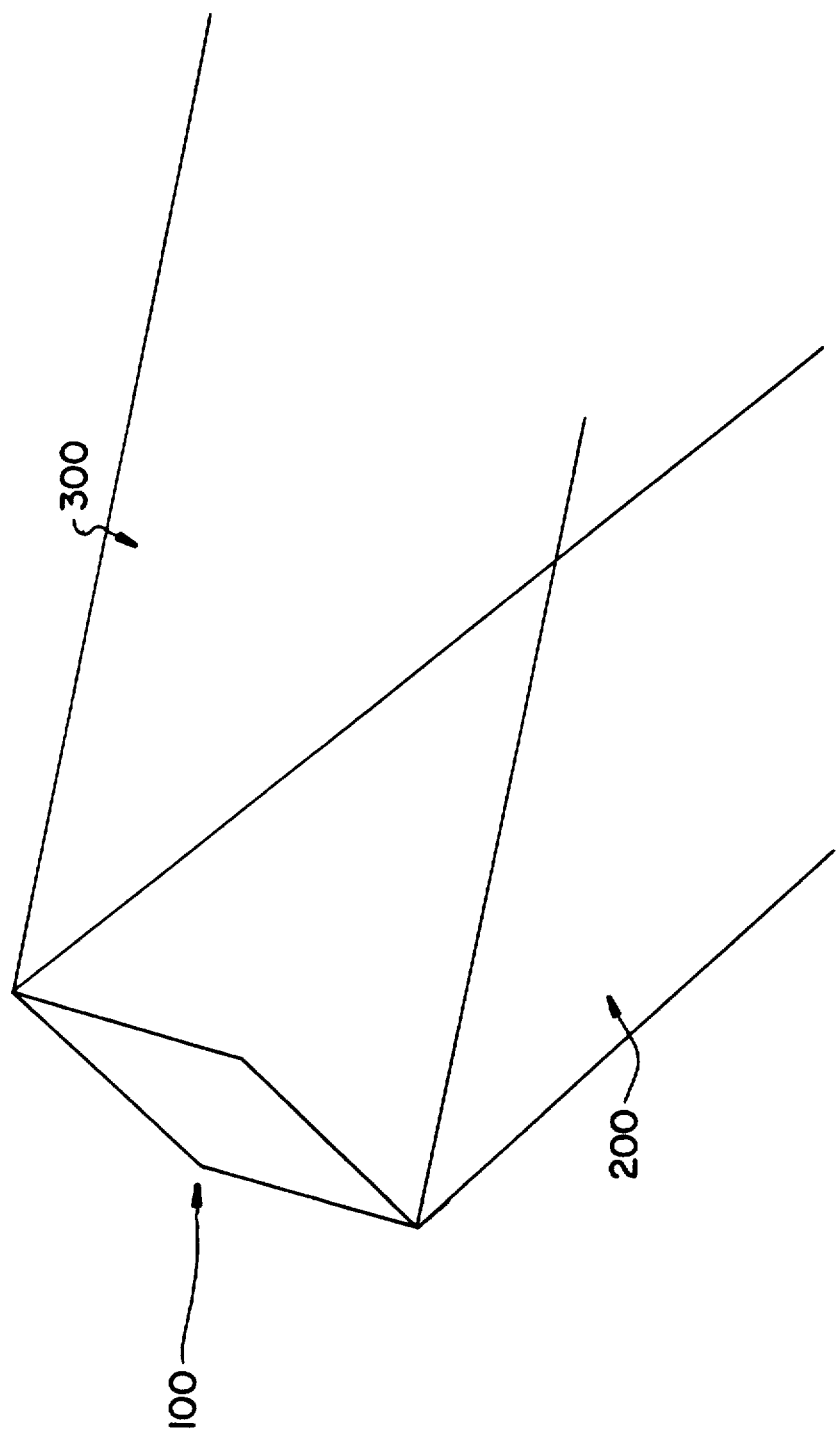

$\sigma_1$ around the small tube's circumference $\sigma_2$ around the large tube's circumference

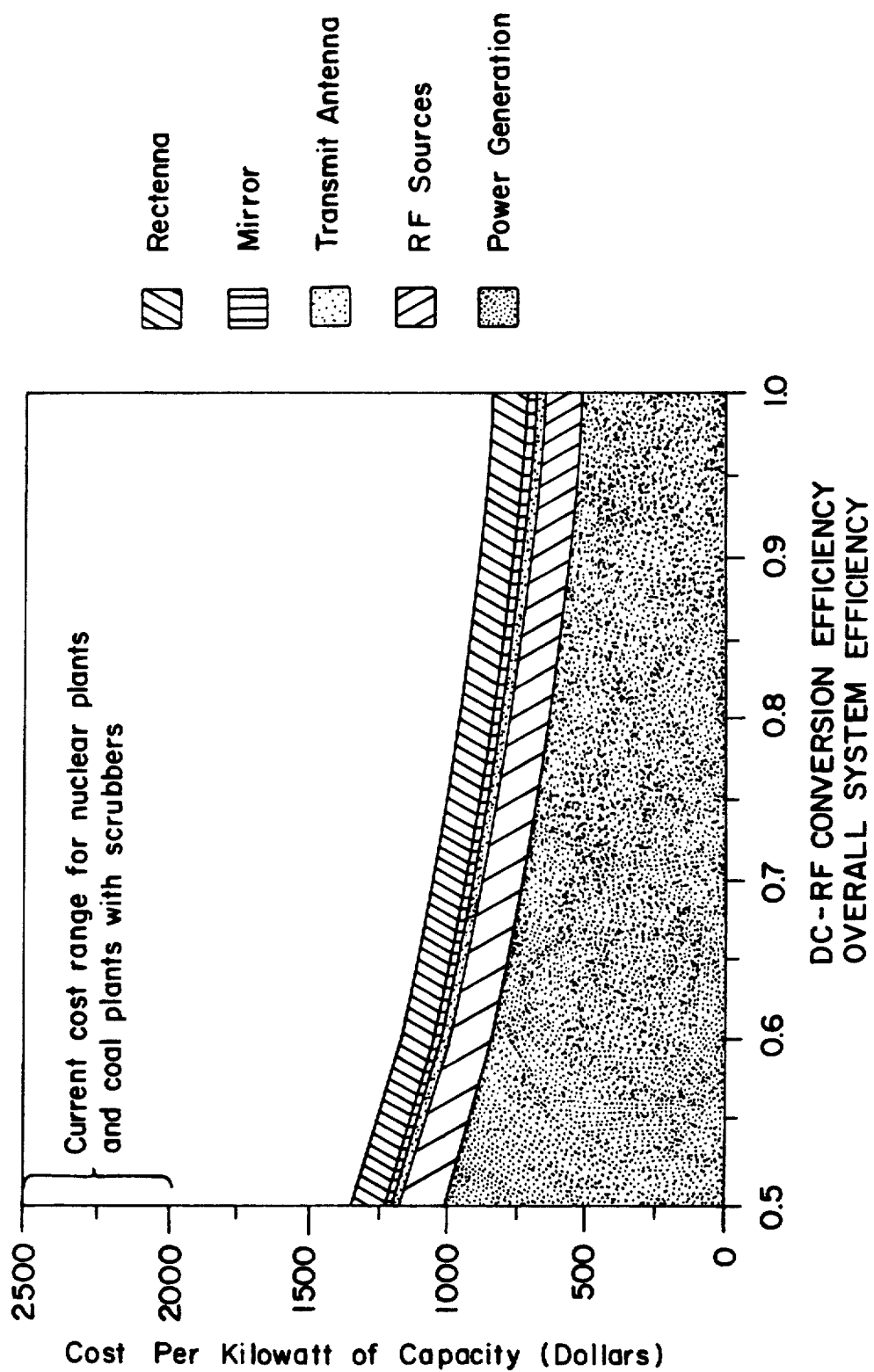

LIGHTWEIGHT FOCUSING REFLECTOR FOR SPACE

BACKGROUND OF THE INVENTION

The invention is directed to reflectors for use in space.

Large reflectors have many important applications in space. Reflectors can be used, for example, to reflect sunlight onto a solar collector or to redirect a microwave power beam. Many applications require that the reflected radiation be focused onto a receiver. In a particular arrangement, the design of the reflector is determined by the ratio of the focal length, f, to the diameter of the reflector, D, required for the application.

When the receiver is far away from the reflector, high f/D ratios are usually required. Although reflectors with high f/D ratios cannot achieve the very high ratios of incident power density to focused power density that reflectors with a low f/D ratio can, reflectors with high f/D ratios can nevertheless increase power density by a factor of five to twenty. This improvement in power density can be very important when the receiver must be made small.

In many applications it is desirable to adjust the focal length of the reflector. For example, if radiation is being directed to different receivers on the ground, it is desirable to adjust the spot diameter, which varies as the focal length varies, to the particular receiver on the ground. Similarly, if radiation is being directed to a moving receiver, such as another satellite, it is desirable to maintain the spot diameter constant as the satellite moves. Unfortunately, conventional reflectors designed for space-based applications, such as the one disclosed in U.S. Pat. No. 3,326,624, issued to von Maydell on June 20, 1967, do not permit adjustment of the reflector focal length.

Because orbiting reflectors must be carried into space, the weight of a reflector is also a primary concern. Rigid reflectors generally are quite heavy and are consequently not ideally suited for space applications.

SUMMARY OF THE INVENTION

It is an object of the invention, therefore, to provide a reflector, for use in space, whose focal length can be readily adjusted.

It is another object of the invention to provide a lightweight reflector suitable for space applications.

According to a first aspect of the invention there is provided an adjustable focal length reflector for operation in space. The adjustable focal length reflector includes a membrane which has a reflective surface. The membrane is subject to incident radiation pressure. An assembly located at the perimeter of the membrane counteracts the incident radiation pressure to vary the focal length of the reflective surface.

In some designs the assembly includes an inflatable structure whose internal pressure is varied to vary the amount of force exerted on the membrane. Engines can be provided to move the adjustable focal length reflector or to maintain the position of the adjustable focal length reflector constant against the radiation pressure.

According to another aspect of the invention there is provided a method of transferring energy. The method includes the steps of (a) irradiating an adjustable focal length reflector which is located in space, and (b) varying the focal length of the adjustable focal length reflector by varying tension applied at the perimeter of the adjustable focal length reflector to counteract radiation pressure on the adjustable focal length reflector.

The irradiating can include varying the intensity of the irradiating to minimize turn-on and turn-off transients.

According to yet another aspect of the invention there is provided a reflection system which includes a reflector located in space. The reflector includes a membrane having a reflective surface which produces a focused beam and a frame located at a perimeter of the membrane. The frame exerts a constant amount of force on the membrane to counteract incident radiation pressure. An irradiator irradiates the reflector. The irradiator varies the intensity of radiation emitted from the irradiator to vary the focal length of the reflector.

Other objects, features, and advantages of the invention will be apparent from the detail description below.

BRIEF DESCRIPTION OF THE DRAWINGS

The invention will be described in further detail below with reference to the accompanying drawings, wherein:

FIG. 2a shows a focal length reflector in the shape of a rectangle;

FIG. 10 is a graph which illustrates the overall efficiency of the invention;

DETAILED DESCRIPTION OF THE PREFERRED EMBODIMENTS

The instant invention is a very lightweight membrane reflection system which can function as a flat or a concave reflector. The focal length of the reflector can be readily adjusted.

In its simplest form, the invention includes a thin membrane which is supported at its edge by an inflatable frame. The membrane is initially flat due to tension applied around its perimeter by the frame. When incident radiation strikes the membrane, radiation pressure stretches the membrane into a concave shape. The precise shape of the membrane is determined by the elasticity of the membrane, the power density of the incident radiation, and the tension applied at the perimeter. The inflatable frame allows the tension to be varied in a very uniform manner by changing the pressure in the inflatable frame. Varying the tension varies the focal length of the membrane. If variation of the focal length is not required in a particular application then the tension is kept constant. Alternatively, the tension can be kept constant and the intensity of the radiation pressure can be varied to vary the focal length of the reflector.

In some applications, the need to stabilize the reflector orbit requires the placement of engines on the frame. In this case, a rigid outer structure may then be required, in addition to the inflatable frame.

Figure 1:
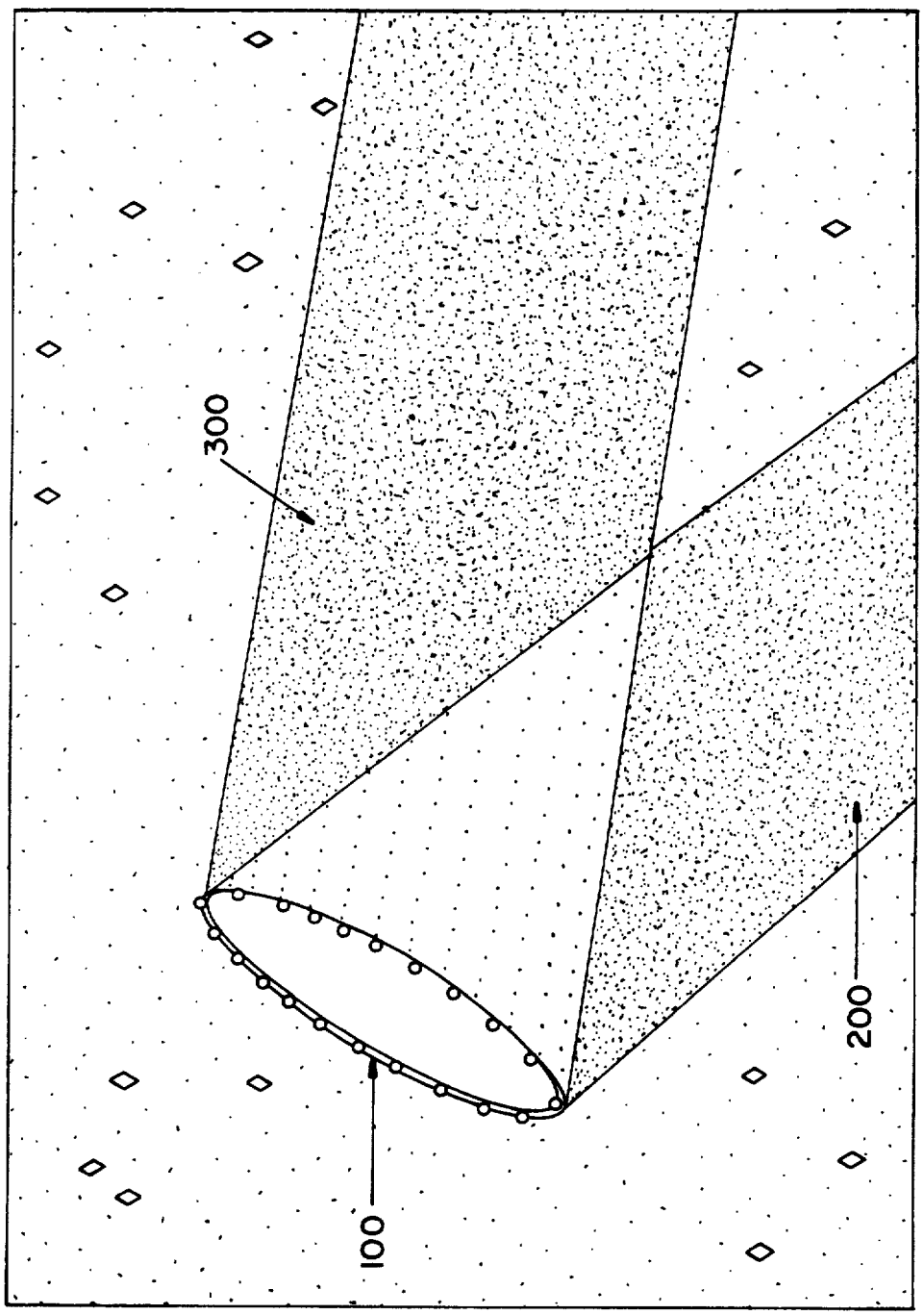
FIG. 1 illustrates an overall view of an adjustable focal length reflector according to a preferred embodiment of the invention.
Figure 2:
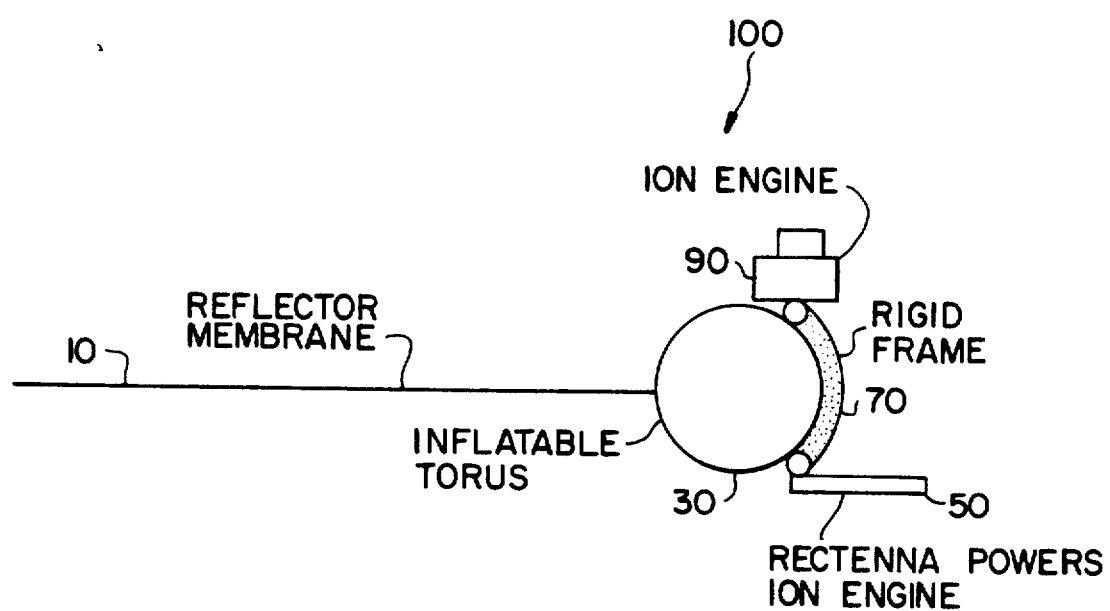
FIG. 2 illustrates an enlarged view of the adjustable focal length reflector of FIG. 1.

FIGS. 1 and 2 illustrate an adjustable focal length reflector 100 according to a preferred embodiment of the invention. The FIGS. 1 and 2 preferred embodiment will be described in complete detail below to provide a complete example of a practical implementation of the invention. However, the invention is not limited to the specific design illustrated in FIGS. 1 and 2. Many variations of the FIGS. 1 and 2 embodiments are possible. For example, although FIGS. 1 and 2 illustrate a circular reflector, other reflector shapes can be used, such as rectangles, ovals, and the like. FIG. 2a shows a reflector in the shape of a rectangle.

As illustrated in FIG. 1, the reflector 100 is positioned in space to reflect incident electromagnetic radiation 200, such as microwave radiation, infrared radiation, or visible light, as reflected radiation 300. The reflector 100 is transported into space folded up and is then unfolded to be deployed.

FIG. 2 illustrates an enlarged view of FIG. 1. As illustrated in FIG. 2, the reflector 100 includes a reflector membrane 10 which serves as a reflective surface. The membrane 10 is attached at its perimeter to an inflatable torus 30. The inflatable torus 30 is attached to a rigid frame 70. The rigid frame 70 can be omitted if additional support is not required. An ion engine 90 and a rectenna 50 are attached to rigid frame 70. Rectenna 50 provides power for the ion engine 90. The rectenna 50 converts incident microwave power into electrical power. The ion engine 90 and the rectenna 50 will be described in further detail later on in the application.

The shape of the membrane is determined by the balance between the tension applied to the membrane by the inflatable torus 30 and the radiation pressure of the incident beam. The analysis provided below applies to a situation where the approximate shape and stress are easily determined. In more complicated situations the analysis of the membrane shape, membrane stress, and the dynamic properties of the membrane under varying conditions requires the iterative numerical solution of several nonlinear differential equations.

In a steady-state situation where the incident radiation is uniform over the surface of the membrane, the radiation pressure applied to the membrane is virtually uniform. When the proper tension is applied to the perimeter of the membrane, the membrane experiences forces similar to the forces experienced by a portion of the surface of an inflated balloon. The radiation pressure P experienced by the membrane can be expressed by the following equation:

$$P = \frac{(1 + \rho) S}{c} \quad (1)$$

where
$\rho$ is the reflection coefficient of the membrane;
S is the incident power density; and
c is the speed of light.

It is desirable to approximate as closely as possible a spherical surface to closely approximate ideal reflectors and to minimize stress in the membrane. If the membrane is spherically shaped, the stress in the membrane is uniform. The stress $\sigma$ can be expressed by the following equation:

$$\sigma = \frac{PR}{2t} = \frac{(1+\rho)SR}{2ct} \quad (2)$$

where
R is the radius of curvature; and
t is the thickness of the membrane.

If the applied circumferential tension T is adjusted so that $T = \sigma t$, the membrane will be stretched into an almost exactly spherical shape having a radius of curvature R in accordance with the following equation:

$$R = \frac{2cT}{(1+\rho)S} \quad (3)$$

Figure 3:
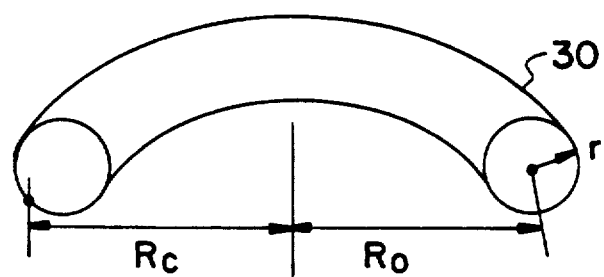
FIGS. 3, 4, and 5 will be used to describe how membrane shape is controlled by controlling pressure in an inflatable torus.
Figure 4:
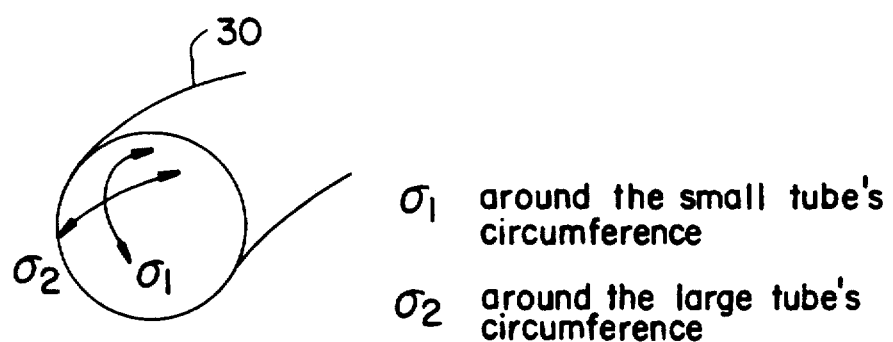

Control of the shape of the membrane by varying the pressure in the inflatable torus 30 will now be described with reference to FIGS. 3, 4, and 5. FIG. 3 illustrates a torus having a major radius $R_o$ and a minor radius r. For a torus of major radius $R_o$ and minor radius r, the stresses $\sigma_1$ and $\sigma_2$ at a point a distance $R_c$ from the center of the membrane are:

$$\sigma_1 = \frac{P_i r}{2 t_t} \quad (4)$$

$$\sigma_2 = \frac{P_i r}{t_t} \cdot \frac{R_c + R_o}{2 R_c} \approx \frac{P_i r}{t_t} \text{ when } R_o >> r \quad (5)$$

where
$P_i$ is the pressure in the torus;
$t_t$ is the thickness of the material the torus is made out of; and
$\sigma_1$ and $\sigma_2$ are the stresses in the directions illustrated in FIG. 4.

The corresponding strains $\epsilon_1$ and $\epsilon_2$ are:

$$\epsilon_1 = \frac{\Delta(\pi r)}{\pi r} = \frac{P_i r}{+E} \left( \frac{1}{2} - \nu \right) \quad (6)$$

$$\epsilon_2 = \frac{\Delta(\pi R_o)}{\pi R_o} = \frac{P_i r}{+E} \left( 1 - \frac{\nu}{2} \right) \quad (7)$$

where
E is Young's modulus for the torus material; and
$\nu$ is Poisson's ratio for the torus material;

The corresponding displacements are:

$$\Delta r = \frac{P_i r^2}{+E} \left( \frac{1}{2} - \nu \right) \quad (8)$$

$$\Delta R_o = \frac{P_i r R_o}{+E} \left( 1 - \frac{\nu}{2} \right) \quad (9)$$

$$\frac{\partial r}{\partial P_i} = \frac{r^2}{+E} \left( \frac{1}{2} - \nu \right) \quad (10)$$

$$\frac{\partial R_o}{\partial P_i} = \frac{r R_o}{+E} \left( 1 - \frac{\nu}{2} \right) \quad (11)$$

Figure 5:
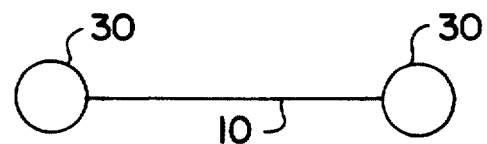

When the membrane is stretched across the inner part of the torus, as illustrated in FIG. 5, and $P_i$ increases then the tension in the membrane will increase if $$\frac{\partial R_o}{\partial P_i} > \frac{\partial r}{\partial P_i} \quad (12)$$

or, alternatively, if $$\frac{\frac{\partial R_o}{\partial P_i}}{\frac{\partial r}{\partial P_i}} = \frac{\frac{rR_o}{tE}\left(\frac{1}{2} - \nu\right)}{\frac{r^2}{tE}\left(1 - \frac{\nu}{2}\right)} = \frac{R_o\left(1 - \frac{\nu}{2}\right)}{r\left(\frac{1}{2} - \nu\right)} > 1 \quad (13)$$

For typical materials, $0 < \nu < 0.5$. For KEVLAR-reinforced plastic $\nu \approx 0.3$. Substituting 0.3 into Equation (13) yields:

$$\frac{\frac{\partial R_o}{\partial P_i}}{\frac{\partial r}{\partial P_i}} = \frac{\partial R_o}{\partial r} \approx \frac{R_o}{r} \cdot \frac{1 - 0.15}{0.5 - 0.15} = 2.4 \frac{R_o}{r} \quad (14)$$

Thus, for typical material values, increasing the pressure in the torus will increase the tension exerted on the membrane. Increasing the tension on the membrane flattens the shape of the membrane.

The behavior of the torus can be changed, if desired, by using materials whose behavior under stress is direction dependent. The simplest way to do this is to alter the density or diameter of the reinforcing fibers in one direction.

The processing capability for controlling the pressure in the torus can be located either on the ground or in space. A gas supply source is provided with the reflector 100 to serve as a source of pressure for the inflatable torus.

For large f/D ratios, a spherical reflector performs nearly as well as an ideal paraboloidal reflector. For reflectors with large f/D ratios, reflector performance is limited principally by diffraction and small-scale surface irregularities.

The focal length of a spherical reflector is half of the radius of curvature R. From Equation (3), the relationship between focal length f and incident power density S is:

$$f = \frac{cT}{(1 + \rho)S} \quad (15)$$

The minimum focal spot diameter $D_{spot}$ is:

$$D_{spot} \approx \frac{\lambda f}{D} \quad (16)$$

where $\lambda$ is the wavelength.

Extremely high f/D ratios produce results indistinguishable from a flat reflector. For a source at infinity, the increase in power density at the receiver is:

$$\frac{S}{S_o} = \frac{\lambda^2 f^2}{D^4} \quad (17)$$

The maximum power density is limited by the strength of the membrane material and the radius of curvature required. Because the membrane is under tension throughout its lifetime, the operating stress in the membrane is restricted to approximately 10–20% of the yield stress by properly selecting the membrane thickness.

The thickness of the membrane can be made non-uniform if a non-spherical shape is required for a particular application.

Figure 6:
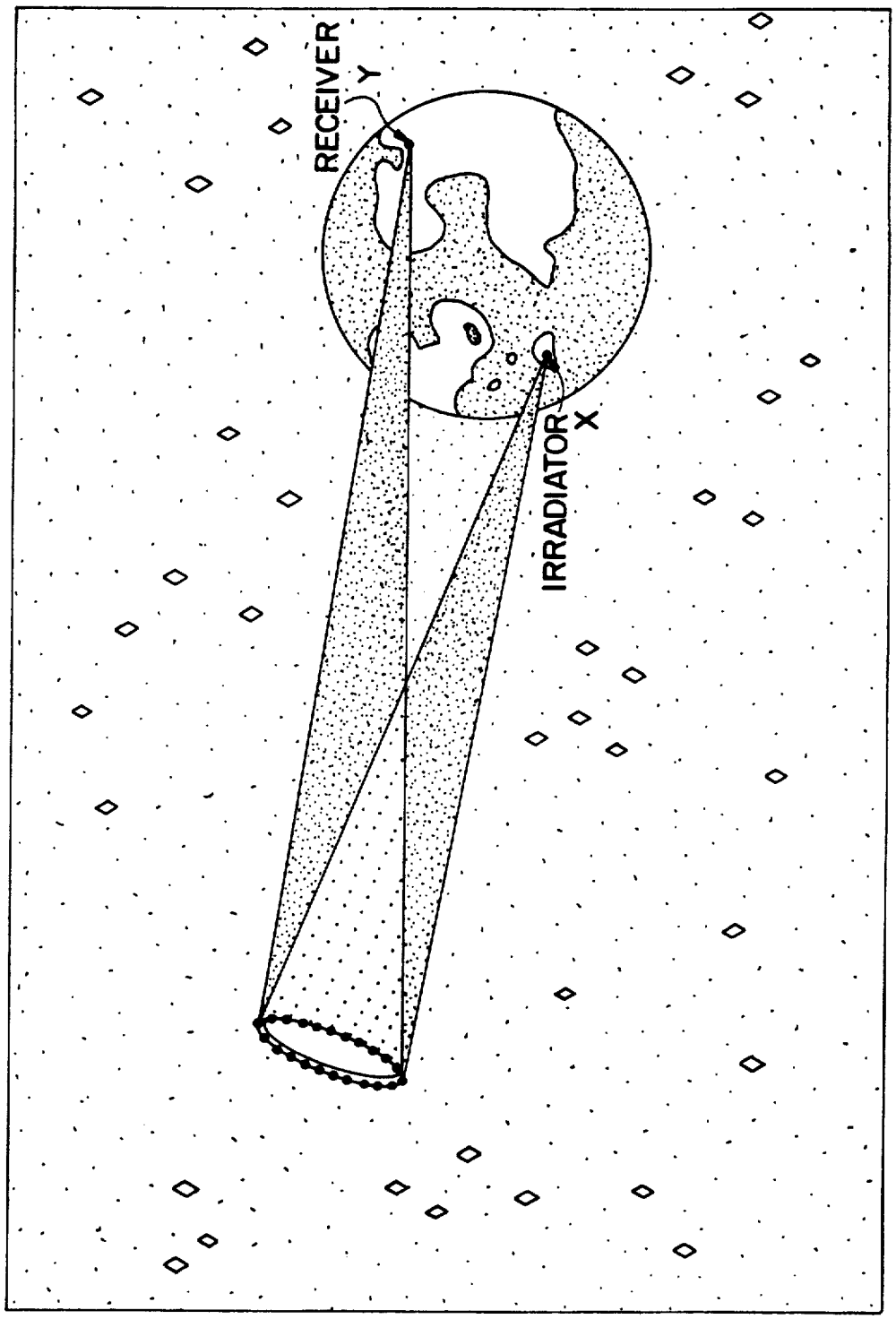
FIG. 6 illustrates an example of an application of the invention.

In the preferred embodiment, the orbiting reflector 100 serves as a 35 GHz power relay system for use between a terrestrial power station and customers separated by distances of several thousand kilometers or more. The reflector 100 is placed in geosynchronous orbit, as illustrated in FIG. 6. The reflector 100 is 500 meters in diameter and is designed to focus reflected energy on a receiving station 45,000 kilometers away. In the preferred embodiment, the inflatable torus 30 is 10 meters in diameter.

The transmitter is located near a source of plentiful fuel, depicted as location X in FIG. 6, and is 2 kilometers in diameter. The receiver is located near a source of high power consumption, for example, near an urban center or a manufacturing center. The receiver is at location Y in FIG. 6, and is 2 kilometers in diameter. To focus on a receiving station 45,000 kilometers away, the reflector 100 has a radius of curvature of 90,000 kilometers. The system is designed to transmit 10 gigawatts of power, which results in a power density at the membrane of 51 kilowatts/meters$^2$. In other applications the transmitter, the receiver, or both, are located in space rather than on Earth.

In the preferred embodiment, the reflector membrane 10 is made of high strength polyester film, such as MYLAR or TEDLAR, that is reinforced with an aramid synthetic fiber, such as KEVLAR. A disadvantage of using MYLAR instead of TEDLAR is that MYLAR is significantly degraded by ultraviolet light. The reflector membrane has a maximum working strength of 690 megapascals (100,000 pounds/in$^2$). The membrane is aluminized on the reflecting side to five skin depths, or 2 micrometers, giving the membrane a reflectivity of 99%. The membrane is also slightly aluminized on its non-reflecting surface to reduce ultraviolet light embrittlement. The inflatable torus is made of the same material as that of the membrane. The rigid frame 70 is made from a composite material, such as carbon fiber.

Other materials can be used for the membrane, such as metal film, or single or multilayer plastic film. Continuous materials are used when the incident radiation has a very small wavelength, as is the case, for example, when the incident radiation is visible light. Woven screen or conductive mesh having a mesh spacing smaller than the shortest wavelength of incident radiation can be used when the incident radiation has a larger wavelength. The membrane should preferably be constructed from a rip-stop material so that holes in the membrane do not get progressively bigger.

In the preferred embodiment, membrane stress is set at 20% of the maximum working strength of the membrane material. Twenty percent of the maximum working strength is 138 megapascals. Substituting 138 megapascals into Equation 2 above for $\sigma$ yields a required membrane thickness t of 0.11 millimeters. Assuming a membrane mass per unit area of 0.16 kilograms/m$^2$, this results in a total mass for the membrane of 32 metric tons. The inflatable torus 30 is made of the same material as the membrane 10 and is 0.5 millimeters thick. The inflatable torus 30 has a mass of 36 metric tons.

When the reflector must be maintained in a stable orbit, it is necessary to apply a force F of $$F = \frac{(1 - \rho) P}{c} \quad (18)$$

to counteract the radiation pressure of the incident power beam. If the radiation pressure is not counteracted the radiation pressure will cause the reflector to move. The radiation pressure is counteracted by providing high specific impulse ion engines on the rigid frame 70. The engines also serve to control the orientation and positioning of the reflector. The engines can also be used to adjust tension in the membrane. The engines are controlled by an orbit stabilization and pointing control system. The processing capability for the orbit stabilization and pointing control system is located either on the ground or in space. The rectenna 50 provides power for the engines. Alternatively, a solar array can be used to provide power for the engines.

Electric engines, particularly ion engines, are well suited for this application. The detailed design of suitable ion engines is set forth in *Physics of Electric Propulsion*, by Robert G. Jahn (McGraw-Hill Book Company 1968), which is incorporated herein by reference. If the reflector is used in a microwave power beaming system such as in the preferred embodiment described above, a small fraction of the beam incident on the edge of the frame is converted to power for the engines. If the reflector is used as a solar concentrator, then power is supplied by solar cells. The required power $Q_{eng}$ can be determined from the following equation:

$$Q_{eng} = \frac{(1 + \rho) Q g I_{sp}}{2 \epsilon c} \quad (19)$$

where
$\epsilon$ is the overall efficiency of the engine, including the power supply;
$I_{sp}$ is the specific impulse;
$Q$ is the total reflected power; and
$g$ is the acceleration of gravity.

The ratio of the total reflected power Q to the power required for orbit stabilization is:

$$\frac{Q_{eng}}{Q} = \frac{(1 + \rho) g I_{sp}}{2 \epsilon c} \approx 3.3 \times 10^{-5} \frac{I_{sp}}{\epsilon} \quad (20)$$

Equation (20) sets a lower limit for the practical size of the orbit stabilization system as a function of the engine design and the system capacity. The required propellant mass $M_{prop}$ can be determined by the following equation:

$$M_{prop} = \frac{(1 + \rho) Q}{c g I_{sp}} \cdot L \quad (21)$$

where
L is the lifetime of the orbit stabilization system.

The power requirement and the propellant mass must be traded off. For radio frequency power systems, where a large amount of electric power is readily available from rectennas on the frame, high $I_{sp}$ engines are optimal.

In the preferred embodiment, one hundred advanced ion engines, each having a thrust of 0.7 Newtons and an $I_{sp}$ of 35,000, are provided. Each engine requires 100 kilowatts of electric power. Each engine is supplied with power by an individual 5 square meter rectenna mounted on the edge of the torus.

The propulsion system and its propellant is a major contributor to the mass of the orbiting reflector. Each of the one hundred advanced ion engines in the preferred embodiment has a mass of approximately 20 kilograms, including the power supply. The total weight of the engines, mountings, and the rectennas is approximately 5 metric tons.

For a ten year lifetime, the orbiting reflector will require approximately 61 metric tons of propellant. The propellant is stored in individual tanks at each engine. Assuming a tankage fraction of 0.2, this brings the total propulsion system mass to 78 metric tons and the total orbiting reflector mass to 146 metric tons. The mass of the orbiting reflector compares favorably to inflatable antennas and reflectors and is far better than rigid antennas and reflectors.

Two types of dynamic effects must be considered. The first of these are pointing errors arising from malfunctions of the orbit stabilization and pointing control system. It is very important to ensure that the reflector is pointed at the correct location on Earth to avoid reflecting radiation into an inhabited area. For a typical system, a worst-case failure of the orbit stabilization and pointing control system, which results in a maximum possible angular acceleration of the reflector, would produce a beam pointing error of 2-3 beam widths after 10 seconds. Ten seconds is sufficient time to perform a controlled shut down of the transmitter. Thus, even in a worst-case scenario the system can be shut down before an inhabited area is affected.

The second dynamic effect that must be considered is the excitation of surface waves on the membrane. A large stretched membrane has a considerable amount of stored energy, which is absorbed from the incident radiation when the beam is first applied, and released when the beam is shut off. An advantage to using an inflatable structure to support the membrane is that inflatable structures have good damping properties. The damping can be further improved, if necessary, by selecting materials that have good damping properties and by the addition of active damping devices on the frame. For example, one or more smaller inflatable tori, which are inflated and deflated rapidly, can be provided between the larger inflatable torus 30 and the membrane 10 for active damping.

Even with the damping features discussed above, turn-on and turn-off transients may occur in some applications. These transients can be minimized by varying the intensity of irradiation to avoid exciting membrane resonances. For example, the intensity of irradiation can be continuously varied from a high intensity to a low intensity. Use of such a procedure does not interfere with the majority of applications.

Figure 7:
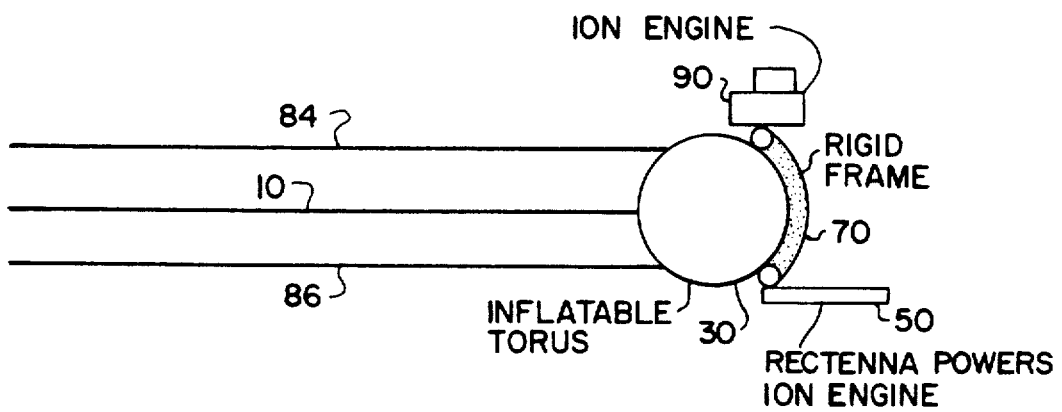
FIG. 7 illustrates a modification to the FIGS. 1 and 2 preferred embodiment.

In microwave power beaming applications, if the incident power density is less than several tens of kilowatts per square meter, an appreciable deformation of the reflector surface may be caused by solar radiation pressure. If precise focal control is necessary, the incident power density, the circumferential tension, or a combination of both is adjusted to compensate for the deformation caused by solar radiation pressure. Alternatively, outer reflectors 84 and 86 can be added to the front or back of the frame, as illustrated in FIG. 7. Outer reflectors 84 and 86 have a thin coating of aluminum to reflect a majority of the incident solar radiation while permitting almost all of the microwave beam to pass through to membrane 10.

Other techniques can be employed to move the reflector 100. The large amount of electrical power available in a power beaming reflection system makes electrodynamic propulsion a viable alternative to other propulsion methods, such as the use of ion engines. Electrodynamic propulsion operates on principles similar to those applied in simple direct current motors, except that electrodynamic propulsion relies on an external source of a magnetic field, such as the Earth.

Electrodynamic propulsion employs electric current to generate forces by interaction of the electric current with an external magnetic field, for example, with the Earth's geomagnetic field.

Figure 8:
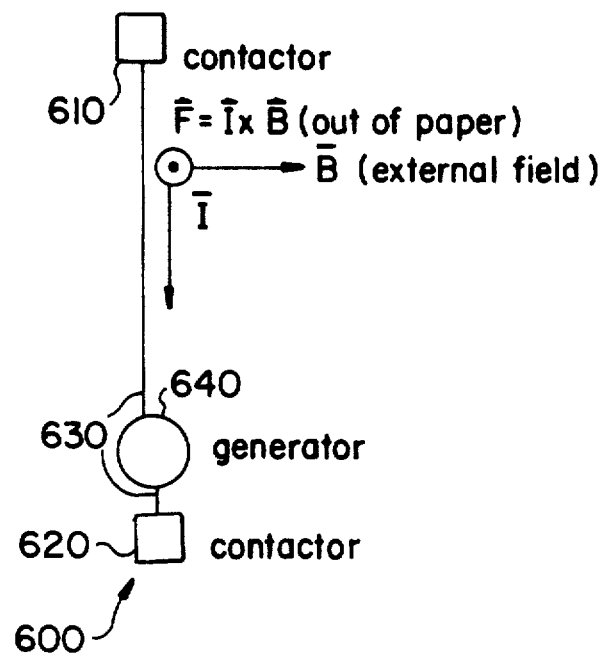
FIG. 8 illustrates a tether electrodynamic propulsion system that can be used to move the reflector.

FIG. 8 illustrates a tether electrodynamic propulsion system 600 that can be used to move reflector 100. The tether electrodynamic propulsion system 600 is rigidly connected to the reflector 100 to exert force $\overline{F}$ on reflector 100. The tether electrodynamic propulsion system 600 includes contactors 610 and 620, conductor (or tether) 630, and generator 640. The generator 640 drives a current $\overline{I}$ along the conductor 630. Contactors 610 and 620 emit positive or negative ions to keep the propulsion system electrically neutral. The Lorentz force created by the external magnetic field $\overline{B}$ on conductor 630 provides thrust to move reflector 100.

Figure 9:
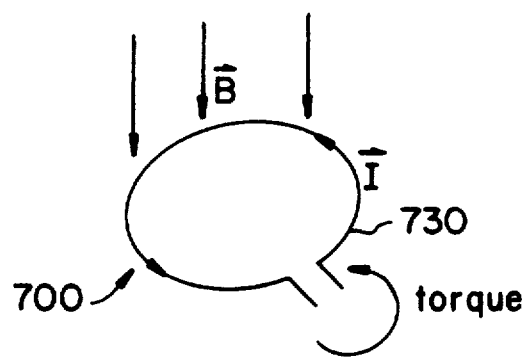
FIG. 9 illustrates a solenoid electrodynamic propulsion system that can be used to move the reflector.

The conductor can also be shaped in the form of a coil 730, as illustrated in FIG. 9. Because the current in the FIG. 9 arrangement flows in a circular path, the force on coil 730 produces torque rather than thrust to move reflector 100. The coil 730 can be made of normal conductors or from superconductors.

Electrodynamic tethers are described in further detail in "A Systems Study of a 100 kW Electrodynamic Tether," by M. Martinez-Sanchez and D. Hastings in the *Journal of the Astronautical Sciences*, v. 35, no. 1, pp. 75-96 (1987), which is incorporated herein by reference.

The instant invention can be used to transmit power less expensively than the use of microwaves to transmit power within the Earth's atmosphere. It is expected that as the cost of deploying equipment in space decreases the cost of using the instant invention to transmit power will become lower than the cost of transmitting power using conventional transmission lines. A cost analysis has been performed using cost projections for the 2000 to 2010 time frame. This cost analysis suggests that a principal limiting factor is the efficiency and the cost of the radio frequency sources, not the cost of fabricating and launching the reflector.

FIG. 10 compares the cost of generating power at a location having high fuel costs with the costs of generating power at a remote location (where fuel is cheap and plentiful) and then transmitting the power to a location having high fuel costs using the instant invention. For example, FIG. 10 illustrates that the cost of using the instant invention is less than $1300 per kilowatt of capacity as compared with $2000-2500 per kilowatt of capacity for conventional generation. The costs in FIG. 10 include the power sources which are assumed to be large gas turbine generators costing $350 per kilowatt hour, the radio frequency sources costing $100 per kilowatt hour, and the transmitting antenna, reflecting membrane, and rectenna costing $100 per kilowatt hour.

Although the invention has been described above with respect to certain specific embodiments, the scope of the invention is not limited to the embodiments described above. Other designs within the scope of the invention will be apparent to those skilled in the art after receiving the above teachings. The scope of the invention, therefore, is defined by the following claims.

What is claimed is:

1. An adjustable focal length reflector for operation in space, said adjustable focal length reflector comprising:
   (a) a membrane, located in space, having a reflective surface, said membrane being subjected to incident radiation pressure; and
   (b) an assembly located at a perimeter of said membrane to exert force on said membrane to counteract said incident radiation pressure such that a focal length of said reflective surface is varied.

2. An adjustable focal length reflector as set forth in claim 1, wherein said assembly includes an inflatable structure whose internal pressure is varied to vary the amount of force exerted on said membrane.

3. An adjustable focal length reflector as set forth in claim 1 wherein said membrane is in the shape of a circle.

4. An adjustable focal length reflector as set forth in claim 1 wherein said membrane is in the shape of a polygon.

5. An adjustable focal length reflector as set forth in claim 1, further comprising:
   at least one engine to move said adjustable focal length reflector.

6. An adjustable focal length reflector as set forth in claim 5, further comprising:
   a receiver which converts a portion of incident radiation into electrical power to provide power for said at least one engine.

7. An adjustable focal length reflector as set forth in claim 1, further comprising:
   at least one engine to maintain the position of said adjustable focal length reflector constant against said incident radiation pressure.

8. An adjustable focal length reflector as set forth in claim 7, further comprising:
   a receiver which converts a portion of incident radiation into electrical power to provide power for said at least one engine.

9. An adjustable focal length reflector as set forth in claim 1, further comprising:
   an outer reflector to minimize the influence of solar radiation on said membrane.

10. An adjustable focal length reflector as set forth in claim 1 wherein the thickness of said membrane is non-uniform such that said membrane has a desired shape when said incident radiation pressure is applied to said membrane.

11. An adjustable focal length reflector as set forth in claim wherein said membrane is formed from continuous material.

12. An adjustable focal length reflector as set forth in claim 1, wherein said membrane is formed from conductive mesh having a mesh spacing smaller than a shortest wavelength of incident radiation.

13. An adjustable focal length reflector as set forth in claim 1, further comprising:
   an electrodynamic propulsion system, said electrodynamic propulsion system including a conductor which carries a current in the presence of an external magnetic field to exert force on said adjustable focal length reflector.

14. An adjustable focal length reflector as set forth in claim 11 wherein said propulsion system comprises means for said generating said current from incident radiation.

15. An adjustable focal length reflector as set forth in claim 1, further comprising:
   an electrodynamic propulsion system, said electrodynamic propulsion system including at least one coil which carries a current in the presence of an external magnetic field to exert torque on said adjustable focal length reflector.

16. An adjustable focal length reflector for operation in space, said adjustable focal length reflector comprising:
   (a) a membrane, located in space, having a reflective surface, said membrane being subjected to incident radiation pressure; and
   (b) an inflatable torus located at a perimeter of said membrane to exert force on said membrane to counteract said incident radiation pressure such that a focal length of said reflective surface is varied.

17. A process of transmitting energy, comprising the steps of:
   (a) irradiating an adjustable focal length reflector located in space, said adjustable focal length reflector including a membrane; and
   (b) varying a focal length of said adjustable focal length reflector by varying tension applied at a perimeter of said membrane to counteract radiation pressure on said membrane.

18. A process as set forth in claim 17, wherein step (a) includes:
   varying the intensity of said irradiating to minimize turn-on transients.

19. A process as set forth in claim 17, wherein step (a) includes:
   varying the intensity of said irradiating to minimize turn-off transients.

20. A process of receiving energy, comprising the steps of:
   (a) receiving radiation from an adjustable focal length reflector located in space, said adjustable focal length reflector including a membrane; and
   (b) varying a focal length of said adjustable focal length reflector by varying tension applied at a perimeter of said membrane to counteract radiation pressure on said membrane.

21. A reflector for operation in space, said reflector comprising:
   (a) a membrane located in space and having a reflective surface which produces a focused beam, said membrane being subjected to incident radiation pressure which causes said membrane to assume a concave shape; and
   (b) a frame located at a perimeter of said membrane, said frame exerting a constant amount of force on said membrane to counteract said incident radiation pressure to keep a focal length of said reflective surface constant.

22. A reflector as set forth in claim 21 wherein said membrane comprises a material which assumes a spherical shape under uniform irradiation.

23. A reflector as set forth in claim 21 wherein said membrane comprises a material which assumes a nonspherical shape under uniform irradiation.

24. A reflection system, said reflection system comprising:
   (a) a reflector located in space, said reflector including
      (i) a membrane having a reflective surface which produces a focused beam, said membrane being subjected to incident radiation pressure which causes said membrane to assume a concave shape; and
      (ii) a frame located at a perimeter of said membrane, said frame exerting a constant amount of force on said membrane to counteract said incident radiation pressure; and
   (b) an irradiator to irradiate said reflector, said irradiator varying an intensity of radiation emitted from said irradiator to vary a focal length of said reflector.

* * * * *